United States Patent [19]

Blaha et al.

[11] Patent Number: 5,121,330

[45] Date of Patent: Jun. 9, 1992

[54] METHOD AND SYSTEM FOR PRODUCT RESTRUCTURING

[75] Inventors: Michael R. Blaha, Niskayuna; William J. Premerlani, Scotia; Robert M. Salemme, Schenectady, all of N.Y.

[73] Assignee: General Electric Company, Schenectady, N.Y.

[21] Appl. No.: 475,466

[22] Filed: Feb. 5, 1990

[51] Int. Cl.$^5$ .................. G06F 15/46; G06F 15/00
[52] U.S. Cl. .................. 364/468; 364/403; 364/488
[58] Field of Search .............. 364/468, 512, 513, 401, 364/402, 424.24, 480, 488

[56] References Cited

U.S. PATENT DOCUMENTS

| | | | |
|---|---|---|---|
| 3,715,730 | 2/1973 | Smith et al. | 340/172.5 |
| 4,149,246 | 4/1979 | Goldman | 364/200 |
| 4,275,449 | 6/1981 | Aish | 364/512 |
| 4,591,983 | 5/1986 | Bennett et al. | 364/403 |
| 4,598,376 | 7/1986 | Burton et al. | 364/470 |
| 4,656,603 | 4/1987 | Dunn | 364/900 |
| 4,658,370 | 4/1987 | Erman et al. | 364/513 |
| 4,727,487 | 2/1988 | Masui et al. | 364/300 |
| 4,734,856 | 3/1988 | Davis | 364/300 |
| 4,827,423 | 5/1989 | Beasley et al. | 364/468 |
| 4,847,761 | 7/1989 | Ferriter et al. | 364/401 |
| 4,862,376 | 8/1989 | Ferriter et al. | 364/468 |
| 4,870,591 | 9/1989 | Cicciarelli et al. | 364/468 |
| 4,887,206 | 12/1989 | Natarajan | 364/468 |
| 4,887,207 | 12/1989 | Natarajan | 364/468 |

OTHER PUBLICATIONS

Blaha et al., "Rotational Database Design Using An Object-Oriented Methodology", Communications of the ACM, vol. 31, No. 4, Apr. 1988.

Blaha et al., "An Extensible AE&C Database Model", Computers chem. Engng. vol. 13, No. 7, 1989, pp. 753-766.

Loomis et al., "An Object Modeling Technique for Conceptual Design", Proceedings of European Conference on Object-Oriented Programming, Paris, Jun. 1987.

Rumbaugh, "Relations as Semantic Constructs in an Object-Oriented Language", OOPSLA '87 Proceedings, Orlando, Oct. 1987, pp. 1-16.

*Primary Examiner*—Jerry Smith
*Assistant Examiner*—Jim Trammell
*Attorney, Agent, or Firm*—Webb, II: Paul R.; James C. Davis, Jr.

[57] ABSTRACT

A system and method for restructuring a product assembly utilizes a knowledge base of past product designs to identify to an expert, which components within the assembly are candidates for replacement with other components. By reducing the varieties of components in assemblies, the cost of manufacturing decreases. Data base management techniques are used to store and maintain data about the makeup of various assembly models and the criteria used to select the components for each assembly. Restructure candidates are identified by manipulating selection tables in such a way as to locate those criteria that have little effect on the choice of a given component. An expert then evaluates the possibility of replacing those components that are currently being used in those small number of cases where the aforementiond selection criteria with little decision making weight actually do determine selection of that particular component.

20 Claims, 10 Drawing Sheets

FIG. 1 (Prior Art)

| | | | ELECTRICAL DEVICE - ASSEMBLY NUMBER | | | | | | | | | | | | | | | | | | |
|---|---|---|---|---|---|---|---|---|---|---|---|---|---|---|---|---|---|---|---|---|---|
| | | | SINGLE PHASE | | | | | | | | | | | THREE PHASE | | | | | | | |
| | | | 10 | | | | | | 15 | | | | | 10 | | | | 15 | | | |
| AMPS | | | 120 | | 220 | | 480 | | 120 | | 220 | | 480 | | 220 | | 480 | | 220 | | 480 |
| VOLTS | | | 1 | 2 | 3 | 4 | 5 | 6 | 7 | 8 | 9 | 10 | 11 | 12 | 13 | 14 | 15 | 16 | 17 | 18 | 19 | 20 |
| CONTROL | | | A | B | A | B | A | B | A | B | A | B | A | B | A | B | A | B | A | B | A | B |
| PART | CAPACITOR | 1 | .5NF200V | X | X | | | | | | | | | | | | | | | | | | |
| | | 2 | 2095K97 | | | X | X | | | | | | | | | | | | | | | | |
| | | 3 | 2095K92 | | | | | X | X | | | | | X | X | | | | | | | | |
| | | 4 | 2095K94 | | | | | | | X | X | | | | | | | | | | | | |
| | COIL | 1 | 2185K76 | X | X | X | X | X | X | X | X | X | X | X | X | | | | | | | | |
| | | 2 | 2185K86 | | | | | | | | | X | X | X | X | X | X | X | X | X | X | X | X |
| NUMBERS | RESISTOR | 1 | 4875K93 | X | X | | | X | | | | X | X | X | X | | | | | | | | |
| | | 2 | 4875K81 | | | | | | | X | X | X | X | X | X | | | | | | | | |
| | | 3 | 4875K86 | | | | | | | | | | | | | X | X | X | | X | X | | |
| | | 4 | 4875K85 | | | | | | | | | | | | | | | X | X | X | X | X | X |

FIG. 5

ELECTRICAL DEVICE TABLE

| ELECTRICAL DEVICE | PHASE | AMPS | VOLTS | CONTROL | CAPACITOR NUMBER | COIL NUMBER | RESISTOR NUMBER |
|---|---|---|---|---|---|---|---|
| 1 | 1 | 10 | 120 | A | 1 | 1 | 1 |
| 2 | 1 | 10 | 120 | B | 1 | 1 | 1 |
| 3 | 1 | 10 | 220 | A | 2 | 1 | 1 |
| 4 | 1 | 10 | 220 | B | 2 | 1 | 1 |
| 5 | 1 | 10 | 480 | A | 3 | 1 | 1 |
| 6 | 1 | 10 | 480 | B | 3 | 1 | 1 |
| 7 | 1 | 15 | 120 | A | 1 | 1 | 2 |
| 8 | 1 | 15 | 120 | B | 1 | 1 | 2 |
| 9 | 1 | 15 | 220 | A | 2 | 1 | 2 |
| 10 | 1 | 15 | 220 | B | 2 | 1 | 2 |
| 11 | 1 | 15 | 480 | A | 3 | 1 | 2 |
| 12 | 1 | 15 | 480 | B | 3 | 1 | 2 |
| 13 | 3 | 10 | 220 | A | 2 | 2 | 3 |
| 14 | 3 | 10 | 220 | B | 2 | 2 | 3 |
| 15 | 3 | 10 | 480 | A | 4 | 2 | 3 |
| 16 | 3 | 10 | 480 | B | 4 | 2 | 3 |
| 17 | 3 | 15 | 220 | A | 2 | 2 | 4 |
| 18 | 3 | 15 | 220 | B | 2 | 2 | 4 |
| 19 | 3 | 15 | 480 | A | 3 | 2 | 4 |
| 20 | 3 | 15 | 480 | B | 3 | 2 | 4 |

| CAPACITOR TABLE | |
|---|---|
| CAPACITOR NUMBER | |
| 1 | |
| 2 | |
| 3 | |
| 4 | |

FIG. 6A

| COIL TABLE | |
|---|---|
| COIL NUMBER | |
| 1 | |
| 2 | |

FIG. 6B

| RESISTOR TABLE | |
|---|---|
| RESISTOR NUMBER | |
| 1 | |
| 2 | |
| 3 | |
| 4 | |

FIG. 6C

CAPACITOR SELECTION TABLE

| CAPACITOR NUMBER | PHASE | AMPS | VOLTS |
|---|---|---|---|
| 1 | 1 | 10 | 120 |
| 1 | 1 | 15 | 120 |
| 2 | 1 | 10 | 220 |
| 2 | 1 | 15 | 220 |
| 2 | 3 | 10 | 220 |
| 2 | 3 | 15 | 220 |
| 3 | 1 | 10 | 480 |
| 3 | 1 | 15 | 480 |
| 3 | 3 | 15 | 480 |
| 4 | 3 | 10 | 480 |

*FIG. 7A*

COIL SELECTION TABLE

| COIL NUMBER | PHASE |
|---|---|
| 1 | 1 |
| 2 | 3 |

*FIG. 7B*

RESISTOR SELECTION TABLE

| RESISTOR NUMBER | PHASE | AMPS |
|---|---|---|
| 1 | 1 | 10 |
| 2 | 1 | 15 |
| 3 | 3 | 10 |
| 4 | 3 | 15 |

*FIG. 7C*

HYPOTHESIS: PHASE IS NOT IMPORTANT FOR
CAPACITOR SELECTION

CAPACITOR SELECTION

| CAPACITOR NUMBER | AMPS | VOLTS |
|---|---|---|
| 1 | 10 | 120 |
| 1 | 15 | 120 |
| $2^2$ | 10 | 220 |
| $2^2$ | 15 | 220 |
| 3,4 | 10 | 480 |
| $3^2$ | 15 | 480 |

*FIG. 8A*

HYPOTHESIS: AMPS IS NOT IMPORTANT FOR
CAPACITOR SELECTION

CAPACITOR SELECTION

| CAPACITOR NUMBER | PHASE | VOLTS |
|---|---|---|
| $1^2$ | 1 | 120 |
| $2^2$ | 1 | 220 |
| $2^2$ | 3 | 220 |
| $3^2$ | 1 | 480 |
| 3,4 | 3 | 480 |

*FIG. 8B*

HYPOTHESIS: VOLTS IS NOT IMPORTANT FOR
CAPACITOR SELECTION

CAPACITOR SELECTION

| CAPACITOR NUMBER | PHASE | AMPS |
|---|---|---|
| 1,2,3 | 1 | 10 |
| 1,2,3 | 1 | 15 |
| 2,4 | 3 | 10 |
| 2,3 | 3 | 15 |

*FIG. 9A*

HYPOTHESIS: ONLY VOLTS IS IMPORTANT FOR
CAPACITOR SELECTION

CAPACITOR SELECTION

| CAPACITOR NUMBER | VOLTS |
|---|---|
| $1^2$ | 120 |
| $2^4$ | 220 |
| $3^{3,4}$ | 480 |

*FIG. 9B*

METHOD AND SYSTEM FOR PRODUCT RESTRUCTURING

The present invention relates to product restructuring, and more specifically, to a computer implemented process and system for analyzing product structure to facilitate product restructuring.

RELATED APPLICATIONS

The present application is related to copending commonly assigned U.S. patent application Ser. No. 07/455,042 entitled "Method and System for Automated Bill-of-Material Generation" filed Dec. 22, 1989 and commonly assigned copending U.S. patent application Ser. No. 07/486,704 entitled "Assembly Table/Selection Table Generation System" filed Feb. 28, 1990.

BACKGROUND OF THE INVENTION

The term "product restructuring" as used herein refers to a process of generating a listing of assembly components, determining whether the assembly is being manufactured in a most efficient manner, and if a more efficient component combination for an assembly appears possible and more economic, generating a component listing for the apparently more efficient assembly. The term "efficiency" as used herein may refer to costs in terms of time, money or other resources. Generally, one assumption utilized in the product restructuring process is that it is more efficient to use identical components in many assemblies rather than using different components in each assembly. More specifically, the cost of manufacturing an assembly increases as the types and varieties of components increase. This increased cost leads to inefficient manufacturing processes and waste.

Limiting the variety of assembly components, however, preferably should not limit the variety of assemblies manufactured. A motor manufacturer, for example, prefers to provide a wide range of models. Therefore, product restructuring should not be performed at the expense of product variety.

In the past, manufacturers have used an assembly matrix to facilitate the product restructuring process. An assembly matrix comprises a matrix wherein each column corresponds to an assembly and each row corresponds to a specific component. An example of an assembly matrix for an electrical device is shown in FIG. 1.

An assembly matrix generally is utilized to identify deviations in the selection of types of components for a variety of assemblies. For example, from a study of the matrix shown in FIG. 1, it is apparent that all 480 volt assemblies use capacitor 2095K92 except the THREE PHASE, 10 Amp model. The THREE PHASE, 10 Amp model therefore is a good candidate for product restructuring. Specifically, if capacitor 2095K92 can be used in this model, capacitor 2095K92 should be used because it will lead to a more efficient manufacturing process.

Although an assembly matrix conveys much information in compact form, it is difficult to find all deviations in the matrix, especially when working with a large matrix involving a large number of assemblies and components, i.e., a large problem domain. When working in a large problem domain, the general practice is to decompose the analysis into a number of sub-matrices. It is time consuming and difficult to generate the assembly sub-matrices for a large number of assemblies including many components. Moreover, using a number of sub-matrices hinders a complete product restructuring analysis. The person performing the restructure process may never be able to directly compare all assembly components in one matrix but rather will be limited to sub-matrix comparison. The assembly matrix method therefore is susceptible to error and is highly dependent upon the expertise of the person generating and studying the matrices.

Another method of product restructuring is known as "synthesis." The synthesis method generally requires one or more experts, who should have a complete understanding of marketing and manufacture, to redesign the product. During the redesign operation, the experts determine which parts and products are needed, and the entire array of parts and products are redesigned from scratch.

Although the synthesis approach may result in massive improvements due to radical changes, the synthesis approach requires expert knowledge which may not always be available. Further, the synthesis approach is susceptible to error due to oversight, and as with the matrix approach, it is highly dependent upon expert knowledge.

It is therefore an object of the present invention to provide a method and system for product restructuring which facilitates more economic generation of products but not at the expense of losing product variety.

Another object of the present invention is to provide a method and system for product restructuring which is easy to use and implement even for a large number of assemblies including many components, i.e., in a large problem domain.

Yet another object of the present invention is to provide a method and system for product restructuring which is not highly dependent upon the expertise of a system user.

Still yet another object of the present invention is to provide a method and system for product restructuring which facilitates a total product restructure analysis.

SUMMARY OF THE INVENTION

The present method and system for product restructuring provides an automated manner in which restructure candidates are easily and quickly identified. A "restructure candidate" is an assembly component identified as being a component which may possibly be eliminated and/or suitable for being replaced by a substitute equivalent component.

In accordance with the present invention, assembly tables and partially-ordered selection criteria tables populated with assembly data are generated. The selection criteria tables express assembly data as rules and control selection of components which will result in an assembly that satisfies predetermined design specifications. More detail with regard to table generation is provided in copending U.S. patent application Ser. No. 455,042, titled "Method And System For Automated Bill-Of-Material Generation", filed Dec. 22, 1989 and incorporated herein, in its entirety, by reference.

Once the selection criteria tables are populated, the system user may quickly and easily modify the selection tables by eliminating and/or substituting selection criteria. During this process, restructure candidates are identified. Once identified, an expert in the particular assembly field can determine whether the identified restructure candidates can actually be replaced or eliminated.

The process continues with an analysis of each restructure candidate and/or until the expert is satisfied with the product structure.

Accuracy and consistency of the present system are not highly dependent upon the expertise of a system user. In fact, once selection criteria are determined, the only point at which a thorough understanding of the problem domain is necessary is when determining whether an identified restructure candidate can be replaced or eliminated. Therefore, the system user can identify the restructure candidates without a need for expert knowledge. This feature alone may result in a substantial savings in costs and expert knowledge resources, including time. It should be understood, however, that expert knowledge is required when determining whether an identified restructure candidate can actually be restructured.

Importantly, the present invention is easy to use and enables a total product restructure analysis. Further, the present method and system, by providing that products can be restructured in an automated manner, also reduce the time required to bring a restructured product to market. The present system facilitates more economic generation of products without sacrificing product variety and provides easy identification of restructure candidates.

BRIEF DESCRIPTION OF THE DRAWINGS

These and other objects of the present invention, together with further features and advantages thereof, will be apparent from the following detailed specification when read together with the accompanying drawings, in which:

FIG. 1 is an example of a prior art assembly matrix;

FIG. 5 illustrates a populated assembly table in accordance with the present invention;

FIGS. 6a-6c illustrate populated sub-assembly tables;

FIGS. 7A-C illustrate selection criteria tables in an electrical device context;

FIGS. 8A-B illustrate, respectively, the resulting selection tables when Phase and Amps, respectively, are eliminated as selection criteria for capacitor selection; and FIGS. 9A-B illustrate, respectively, the resulting selection tables when Volts is eliminated as a selection criteria and when Volts is the only selection criteria for capacitor selection.

DETAILED DESCRIPTION OF THE DRAWINGS

The present invention is directed to a system architecture and method for automated product restructuring, and the present invention is not directed to any particular set of data or rules for carrying out a particular product restructure process. Therefore, although the present invention may be described herein with reference to, for example, an electrical device, such example is for illustrative purposes only. The present invention may be utilized for product restructuring of many products and processes, including even computer software. Further, the present system architecture and method are to be practiced on a computer. The present invention, however, is not limited to practice on one specific computer.

Figure 2A:
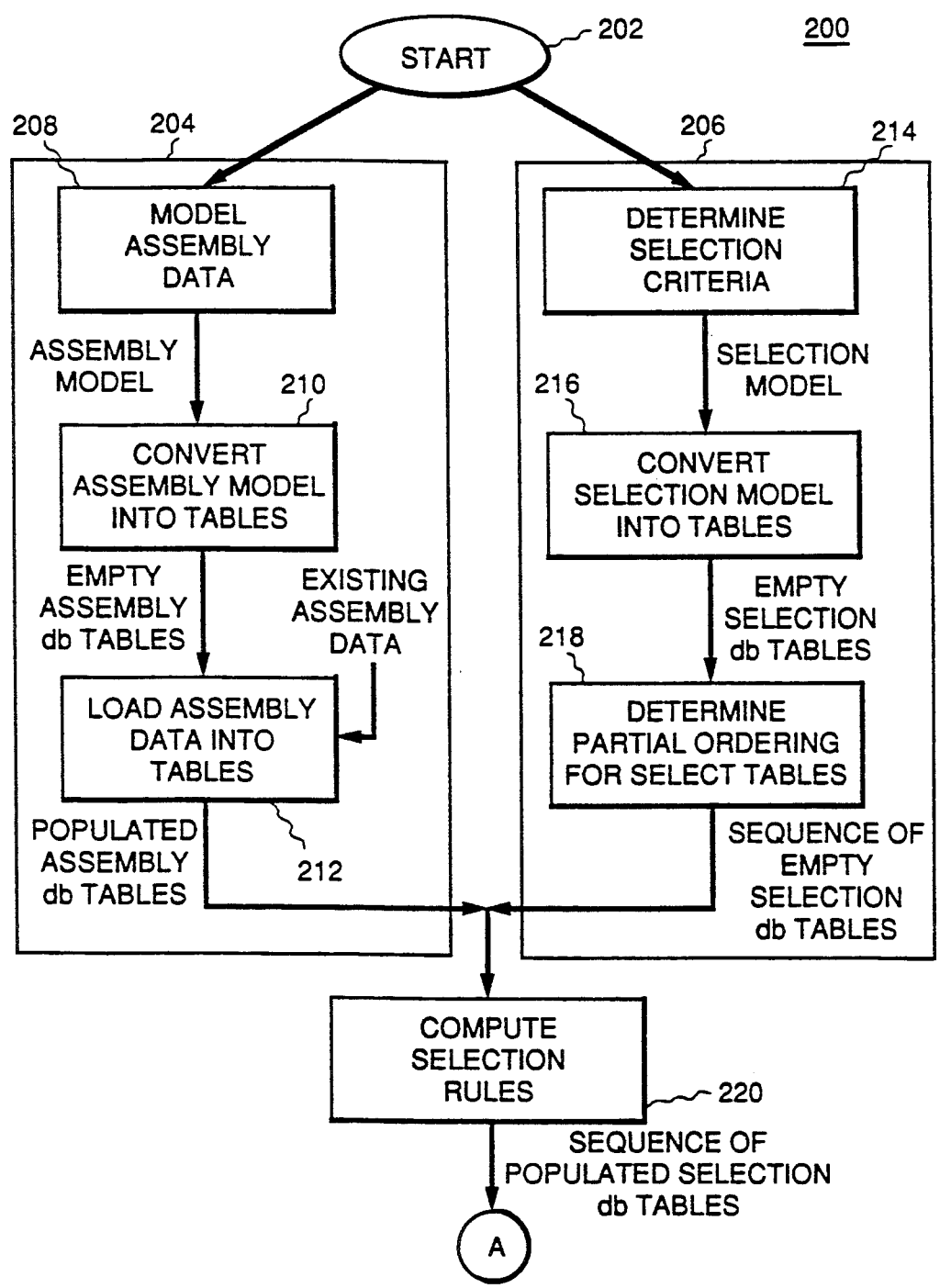
FIGS. 2a and 2b are a flowchart illustrating the present system.
Figure 2B:
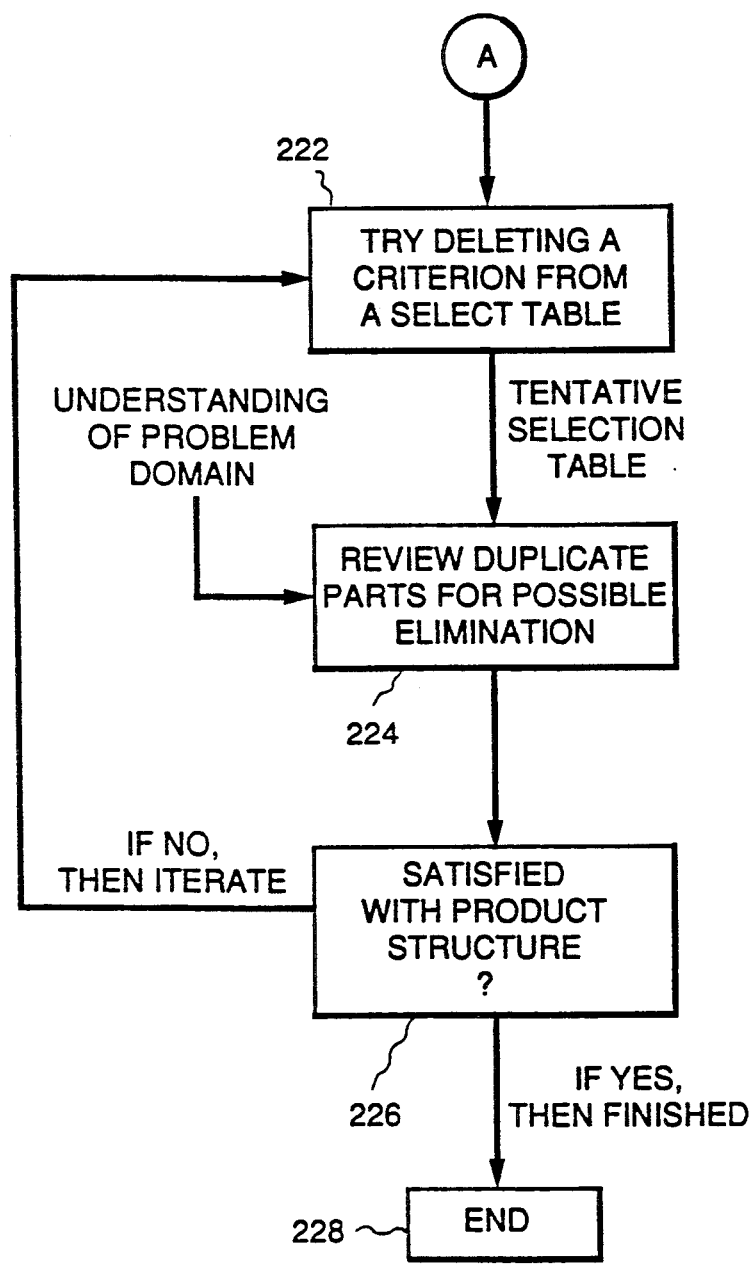

Referring now more particularly to the drawings, FIG. 2 illustrates, in a flow diagram 200, the sequence of process steps required to make and use the present product restructuring system. To further facilitate a better understanding of the present invention, the sequence of process steps is described herein with reference to an example illustrated in FIGS. 3 to 9. The example shown in FIGS. 3 to 9 illustrates how the present invention would be made and used in an electrical device context. The particular electrical device includes a capacitor, a coil and a resistor. The example is shown for illustrative purposes only.

Referring now more specifically to FIG. 2, once the process is initiated as indicated at "START" block 202, an assembly table generation process 204 and a selection table generation process 206 are begun. Although shown as being performed in parallel, these processes could be performed in series in any sequential order.

Figure 3:
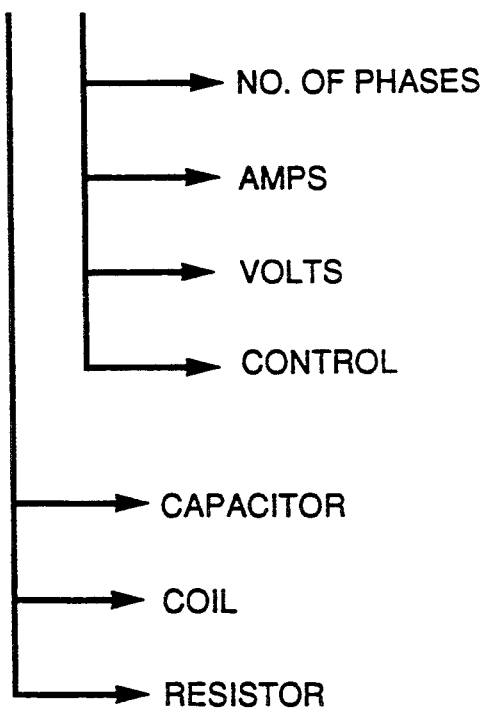
FIG. 3 is an example of a hierarchal representation for an electrical device.

In assembly table generation process 204, and as indicated at block 208, a system user first models product structure and determines which parts, i.e. subassemblies, compose a complete assembly. In the electrical device context, and as shown in FIG. 3, many parts would compose the assembly and only one level of subassemblies is shown in FIG. 3. Many other subassemblies are contemplated and could be included. Note that the model created by the system user may be in one of many forms and, for example, may even be in a hierarchical tree form described in Ferriter et al., U.S. Pat. No. 4,847,761.

The next step in the assembly table generation process, as indicated at block 210, is to convert the assembly model into tables. The preferred table format results from utilizing a technique known as the Object Modeling Technique described in Blaha et al., "Relational Database Design Using An Object-Oriented Methodology," Communications of the ACM, 31, Apr. 4, 1988, which is incorporated herein, in its entirety, by reference.

Figure 4:
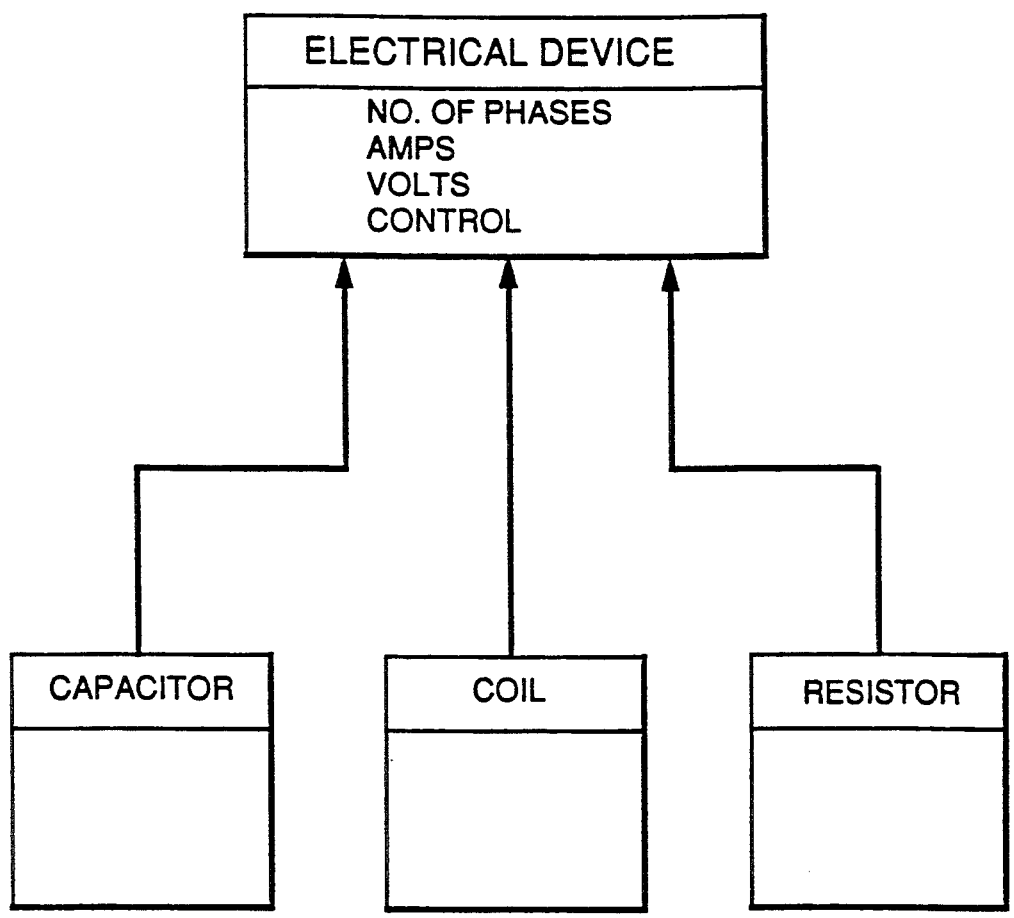
FIG. 4 is an object oriented representation of the electrical device represented in FIG. 3.

With the electrical device, the tables which would be created by using the Object Modeling Technique for the model shown in FIG. 4 are illustrated in FIG. 5. Each box in FIG. 4 denotes an object class and each object class corresponds to part of a relational database management system table. The model includes connectivity in a hierarchal format, illustrated as lines with arrows at their ends. Specifically, a capacitor, a coil and a resistor compose the electrical device. A lower portion of the box labelled ELECTRICAL DEVICE sets forth attributes for that object class.

The specific configuration for the assembly tables for each assembly may be in one of many forms, and the present invention is not limited to any particular format. For example, as shown in FIG. 5 and in the electrical device context, the table labelled "Electrical Device Table" may include information from the "Electrical Device" class in FIG. 4, and information related to each subassembly. Each subassembly, as shown in FIG. 6, may also be represented in a respective table, i.e. a "CAPACITOR TABLE", "COIL TABLE" and a "RESISTOR TABLE".

The next, and generally final, step in the assembly table generation process is to load assembly data into the generated tables as indicated at block 212. If the assembly data is stored electronically, the assembly table could be populated through an electronic transfer of data. If, however, the assembly data is not stored in a compatible or electronic format, the assembly data may have to be manually entered such as through a keyboard interface or by scanning a printout of the data with an optical character recognition system.

For the electrical device example, the populated assembly tables which would be generated are illustrated in FIGS. 5 and 6. In this example, twenty different electrical devices having different model numbers are shown. Some of the subassemblies, e.g. capacitor, coil, would include components which may be utilized in more than one device, and therefore, less than twenty subcomponents of capacitors and coils would be shown in their respective tables. For example, and as shown in FIG. 5, capacitor "1" is utilized in electrical devices 1, 2, 7 and 8. In the capacitor subassembly table shown in FIG. 6, however, only one entry for capacitor "1" is required.

Selection table generation process 206, as indicated at block 214, begins by determining selection criteria. Selection criteria are the factors which determine a part to be selected, and the selection criteria generally are elicited from experts in a particular technological field. In the electrical device context and as shown in FIG. 7A, a capacitor would be selected based upon the "Phase", "Amps" and "Volts". Therefore, "Phase", "Amps" and "Volts" are the capacitor selection criteria. Likewise, and as shown in FIG. 7B, selection criteria for a coil is "Phase", and as shown in FIG. 7C selection criteria for a resistor are "Phase" and "Amps". Selection criteria are determined for each subassembly.

Once the selection criteria are determined, the criteria are converted into a table format as indicated at block 216. At this point, the selection tables would be empty, i.e. no assembly data in the tables. In the electrical device context, the selection criteria model which would be created is shown in FIGS. 7A–C. It should be apparent that while the assembly model tables would describe an electrical device, the selection criteria tables provide a format for choosing an electrical device.

The next step, as indicated at block 218, is to determine a partial ordering for the selection tables. This partial ordering must be determined on an application specific basis. For example, in a motor context, one subassembly of a motor is an end shield. Generally, screws are utilized to mount the end shield to another part of the assembly. Before the type and number of screws can be selected, the type of end shield must be known. Therefore, the end shield selection process must be performed prior to the screw selection process. The partial ordering process may be performed by a human operator or may be automated. An automated partial ordering process, for example, may be performed by a computer implemented process. Expert knowledge generally is not required to perform the ordering process. This partial ordering process is not necessary for practice of the present invention.

As a result of the above-described selection table generation process, a sequence of empty, partially ordered, selection database tables are generated. Further, as a result of the assembly table generation process, populated assembly database tables will have been generated. The next step, as indicated at block 220, is to compute selection rules, i.e., generate populated selection criteria tables. This step may be performed by determining all possible combinations of subassemblies utilizing the assembly table and selection table. For example, referring to FIG. 7A and in an electrical device context, the capacitor selection table actually would be an expression of a logic rule. In the capacitor selection operation, the rule would be expressed as:

If "Phase" = A and "Amps" = B and "Volts" = C, then "Capacitor Number" = D.

For example, if the Phase is "3", Amps is "10" and Volts is "220", then the selected capacitor will be capacitor number "2". Values for Phase, Amps and Volts are variable, and may be referred to herein as selection criteria variables. By utilizing the capacitor rule, and scanning the assembly table for all encountered combinations of the rule elements, e.g. Phase, Amps and Volts, the criteria selection tables would be populated.

More detail with regard to the table generation processes is provided in copending U.S. patent application Ser. No. 455,042, titled "Method And System For Automated Bill-Of-Material Generation", filed Dec. 22, 1989 and as pointed out above, incorporated herein, in its entirety, by reference.

The process, up to this point and as described above, may require a relatively long time period, e.g. weeks, to complete as compared to the time required for the following described product restructure processes, e.g. minutes. More specifically, the time required to generate populated assembly and selection criteria tables is greater than the time required to perform the restructure analysis of these tables. The time required to generated populated assembly and selection criteria tables depends upon the specific problem domain. Importantly, although the table generation process may require a relatively long time period to complete, the process need only be performed once. Therefore, the overall restructure process may require less time to complete than other known restructure processes.

The next step, as indicated at block 222, is to try deleting a selection criterion from a selection table. For example, in the electrical device context, the coil and resistor selection tables, FIGS. 7B and 7C, appear compact, so there does not appear to be much potential restructuring of these components. The capacitor selection table, FIG. 7A, on the other hand, appears relatively long. Therefore, the capacitor selection table most likely will include some restructure candidates.

As shown in FIG. 8A, and as a first hypothesis, the system user may try deleting Phase as a selection criterion from the capacitor selection table. The selection table is then scanned to determine a modified selection table. Specifically, the remaining selection criteria, e.g. Amps and Volts, are combined where identical to correspond to one row. For example, FIG. 8A illustrates the results if Phase is not used as a selection criteria. The "2?" in the row corresponding to "10 Amps" and "220 Volts" means that capacitor number 2 is selected at both occurrences of "10 Amps", "220 Volts".

Based upon the results shown in FIG. 8A, it should be apparent that Phase is not a critical selection criteria in capacitor selection. In fact, the only role of phase is to resolve the case of 10 Amps, 480 Volts. Capacitor 3 is used in a first 10 Amp, 480 Volt assembly and capacitor 4 is used in a second 10 Amp, 480 Volt assembly.

A next step in the restructure analysis, as shown in block 224 in FIG. 2, is to review parts for possible elimination. Determining whether a component may be eliminated or whether a substitute part may be utilized requires an understanding of the problem domain. Identifying these restructure candidates, however, does not require expert knowledge. For example, from the results shown in FIG. 8A, capacitor numbers 3 and 4 are identified as restructure candidates, i.e., it may be possible to use either capacitor number 3 or capacitor number 4, rather than capacitor number 3 for one 10 Amp 480 Volt configuration and capacitor number 4 for another 10 Amp, 480 Volt configuration. Determining whether a substitution may be made, however, requires an understanding of the problem domain.

After the identified restructure candidates are identified and analyzed, and as shown in block 226 in FIG. 2, the system user/expert determines whether the present product structure is satisfactory. If the system user/expert is satisfied with the structure, then operations are stopped as indicated by an end block 228.

If, however, the system user is not satisfied with the product structure, the system user may continue operations by again modifying the selection criteria table by deleting a different criteria from the table as shown in block 222. For example, FIG. 8B illustrates the results of this step in the electrical device context. In FIG. 8B, Amps has been deleted as a selection criterion from the capacitor selection table From FIG. 8B, it is apparent that the only role of the "Amps" criteria is to resolve the case of the "3 Phase" "480 Volt" configuration. It also is apparent that capacitors number 3 and 4 may be suitable for restructuring, as was also evident from the selection criteria table when "Phase" was taken out as a selection criteria.

As shown in FIG. 9A, the system user then tried deleting "Volts" as a selection criteria in capacitor selection. From the results shown in FIG. 9B, it is apparent that "Volts" is an important selection criteria in capacitor selection because it is needed to resolve which "Capacitor Number" to select for every configuration.

From the foregoing process of deleting selection criteria and identifying restructure candidates, the system user then reasoned that "Volts" may be the only necessary selection criteria and these results are shown in FIG. 9B. As is apparent from FIG. 9B, the only row where more information is needed to determine the "Capacitor Number" is the row corresponding to "480 Volts", and this row includes the previously identified restructure candidates. This selection table also evidences that Capacitor Number 3 is more popular than Capacitor Number 4. That is, Capacitor Number 3 is utilized in three configurations whereas Capacitor Number 4 is utilized in only one configuration. In accordance with the previous explained assumptions of product restructing, Capacitor Number 4 is the best candidate for product restructuring. Once identified, a system user with an understanding of the electrical device may decide whether Capacitor Number 4 can be eliminated and, for example, Capacitor Number 3 used in its place.

The processes of the present invention may, for example, be performed on and/or by a computer known in the art as a VAX 11/785, and generally are controlled by a human system user. The present invention may be utilized with most all commercially available computer systems, and it is contemplated that artificial intelligence techniques may be utilized in combination with the human-performed steps.

From the foregoing discussion, it should be apparent that the present system and method provide easy identification of restructure candidates. The selection table analysis may be extended and effectively utilized in a large problem domain and is easy to automate. It should be understood, however, that the system is an adjunct and stimulus to human decisions in the manufacturing process. Specifically, a person with an understanding of the problem domain must determine whether identified restructure candidates may actually be restructured.

The present invention also facilitates a complete restructure analysis. The step-by-step procedure of the present invention is easy to implement, and does not require expert knowledge for identifying restructure candidates. Design accuracy and consistency of the present system are not highly dependent upon the expertise of a system user. Although an understanding of the problem domain is required at one point, the present invention operates more on a "trial and error" basis than being dependent upon expert knowledge. The present system therefore reduces errors which may result from inconsistent design techniques. Also, in order to implement a new design technique, the present system can be easily modified so that the stored data and rules conform to the new design technique.

The present method and system, by providing that products can be restructured in an automated manner, also reduces the time required to bring a restructured product to market. The present system also facilitates more economic generation of products without sacrificing product variety.

While an embodiment has been illustrated and described herein, it will be apparent that numerous modifications, changes, variations, substitutions, and equivalents, in whole or in part, will now occur to those skilled in the art without departing from the spirit and scope contemplated by the invention. Accordingly, it is intended that the invention be limited only by the scope of the appended claims.

We claim:

1. A method for restructuring a product, populated selection tables for the product having been previously generated, said method comprising the steps of:

deleting selection criteria from a selected selection table whereby a first modified selection table is created;

generating a second modified selection table from the first modified selection table; and identifying restructure candidates from the second modified selection table.

2. A method for restructuring a product in accordance with claim 1 wherein deleting a selection criteria from a selected selection table comprises the steps of:

hypothesizing as to a single selection criteria which may not be necessary to perform selection of a component; and eliminating the single hypothesized selection criteria from the selection table.

3. A method for restructuring a product in accordance with claim 1 wherein deleting a selection criteria from a selected selection table comprises the steps of:

hypothesizing as to a plurality of selection criteria which may not be necessary to perform selection of a component; and eliminating the plurality of hypothesized selection criteria from the selection table.

4. A method for restructuring a product in accordance with claim 1, the selection table comprising rows which correspond to a component to be selected and columns corresponding to selection criteria variables, and wherein generating a second modified selection table comprises the steps of:

combining, in a single row, all rows of selection criteria variables which have identical values; and providing an indication as to each component to be selected for each row of selection criteria variables so that if a plurality of components are utilized for a single row of identical variable values, a plurality of components will be identified as corresponding to said single row.

5. A method for restructuring a product in accordance with claim 4 wherein identifying structure candidates comprises the step of:

identifying each row having a plurality of corresponding components; and identifying each component in each identified row as a restructure candidate.

6. A method for restructuring a product in accordance with claim 1 further comprising the step of:

substituting a selected one of the restructure candidates for a selected one of the restructure candidates in the selected selection table.

7. A method for restructuring a product in accordance with claim 6 wherein deleting a selection criteria from a selected selection table comprises the steps of:

hypothesizing as to a single selection criteria which may not be necessary to perform selection of a component; and eliminating the single hypothesized selection criteria from the selection table.

8. A method for restructuring a product in accordance with claim 6 wherein deleting a selection criteria from selected selection table comprises the steps of:

hypothesizing as to a plurality of selection criteria which may not be necessary to perform selection of a component; and eliminating the plurality of hypothesized selection criteria from the selection table.

9. A method for restructuring a product in accordance with claim 6, the selection table comprising rows which correspond to a component to be selected and columns corresponding to selection criteria variables, and wherein generating a second modified selection table comprises the steps of:

combining, in a single row, all rows of selection criteria variables which have identical values; and providing an indication as to each component to be selected for each row of selection criteria variables so that if a plurality of components are utilized for a single row of identical variable values, a plurality of components will be identified as corresponding to said single row.

10. A method for restructuring a product in accordance with claim 9 wherein identifying restructure candidates comprises the step of:

identifying each row having a plurality of corresponding components; and identifying each component in each identified row as a restructure candidate.

11. An apparatus for restructuring a product, populated selection tables for the product having been previously generated, said apparatus comprising:

means for deleting selection criteria from a selected selection table and creating a first modified selection table;

means for generating a second modified selection table from the first modified selection table and;

means for identifying restructure candidates from the second modified selection table.

12. A apparatus for restructuring a product in accordance with claim 11 wherein said means for deleting a selection criteria from a selected selection table comprises:

means for hypothesizing as to a single selection criteria which may not be necessary to perform selection of a component; and means for eliminating the single hypothesized selection criteria from the selection table.

13. An apparatus for restructuring a product in accordance with claim 11 wherein said means for deleting a selection criteria from a selected selection table comprises:

means for hypothesizing as to a plurality of selection criteria which may not be necessary to perform selection of a component; and means for eliminating the plurality of hypothesized selection criteria from the selection table.

14. An apparatus for restructuring a product in accordance with claim 11, the selection table comprising rows which correspond to a component to be selected and columns corresponding to selection criteria variables, and wherein said means for generating a second modified selection table comprises:

means for combining, in a single row, all rows of selection criteria variables which have identical values; and means for providing an indication as to each component to be selected for each row of selection criteria variables so that if a plurality of components are utilized for a single row of identical variable values, a plurality of conponents will be identified as corresponding to said single row.

15. An apparatus for restructuring a product in accordance with claim 14 wherein said means for identifying restructure candidates comprises:

means for identifying each row having a plurality of corresponding components; and means for identifying each component in each identified row as a restructure candidate.

16. An apparatus for restructuring a product in accordance with claim 11 further comprising:

means for substituting a selected one of the restructure candidates for a selected one of the restructure candidates in the selected selection table.

17. An apparatus for restructuring a product in accordance with claim 16 wherein said means for deleting a selection criteria from a selected selection table comprises:

means for hypothesizing as to a single selection criteria which may not be necessary to perform selection of a component; and means for eliminating the single hypothesized selection criteria from the selection table.

18. An apparatus for restructuring a product in accordance with claim 16 wherein said means for deleting a section criteria from a selected selection table comprises:

means for hypothesizing as to a plurality of selection criteria which may not be necessary to perform selection of a component; and means for eliminating the plurality of hypothesized selection criteria from the selection table.

19. An apparatus for restructuring a product in accordance with claim 16, the selection table comprising rows which correspond to a component to be selected and columns corresponding to selection criteria variables, and wherein said means for generating a second modified selection table comprises the steps of:

means for combining, in a single row, all rows of selection criteria variables which have identical values; and means for providing an indication as to each component to be selected for each row of selection criteria variables so that if a plurality of components are utilized for a single row of identical variable values, a plurality of components will be identified as corresponding to said single row.

20. An apparatus for restructuring a product in accordance with claim 19 wherein said means for identifying restructure candidates comprises:

means for identifying each row having a pluality of corresponding components; and means for identifying each component in each identified row as a restructure candidiate.

* * * * *